United States Patent [19]
Lowles et al.

[11] Patent Number: 5,754,422
[45] Date of Patent: May 19, 1998

[54] CCD CAMERA SYSTEM WITH RECONFIGURABLE HARDWARE AND METHOD OF OPERATION THEREOF

[75] Inventors: Robert James Lowles; John Paul Hackett, both of Cambridge, Canada

[73] Assignee: Com Dev Ltd., Cambridge, Canada

[21] Appl. No.: 634,672

[22] Filed: Apr. 18, 1996

[30] Foreign Application Priority Data

Apr. 18, 1995 [GB] United Kingdom ............... 9507840

[51] Int. Cl.$^6$ ............................................. H04N 7/20
[52] U.S. Cl. .......................... 364/130; 348/143; 348/144
[58] Field of Search ................................ 348/143, 144, 348/13, 145, 207; 364/130, 551.01, 556, 560, 562, 559; 382/100, 190; 356/124, 127, 348

[56] References Cited

U.S. PATENT DOCUMENTS

| | | | |
|---|---|---|---|
| 4,851,914 | 7/1989 | Pfanhouser et al. | 348/217 |
| 5,081,297 | 1/1992 | Lebel et al. | 395/284 |
| 5,309,183 | 5/1994 | Sasaki et al. | 348/233 |
| 5,404,375 | 4/1995 | Kroeger et al. | 375/200 |

Primary Examiner—James P. Trammell
Assistant Examiner—Demetra R. Smith
Attorney, Agent, or Firm—Daryl W. Schnurr

[57] ABSTRACT

A CCD camera system has reconfigurable hardware and is controlled by a computer having reconfigurable software. The computer can receive and transmit signals between the system and a ground station. The hardware and software are reconfigurable based on signals from the ground station.

12 Claims, 2 Drawing Sheets

CCD CAMERA SYSTEM WITH RECONFIGURABLE HARDWARE AND METHOD OF OPERATION THEREOF

BACKGROUND OF THE INVENTION

1. Field of the Invention

This invention relates to reprogrammable hardware and software CCD camera systems for satellites and a method of operation thereof.

This invention relates to CCD camera systems that have reprogrammable hardware and reprogrammable software that can be reconfigured using signals from a ground station.

2. Description of the Prior Art

It is known to have CCD (charge coupled devices) camera systems in satellites. These systems are designed based on an understanding of the operating environment (i.e. relating to radiation) and the operating characteristics of the CCD. Current CCD camera systems use discrete logic or discrete logic with software control to configure the operating parameters of the system based on the latest knowledge of the environment and the operating characteristics of the CCD. The understanding of the operating environment and operating characteristics of the CCD are continuously evolving. However, after a system has been launched into space, the hardware can no longer be reconfigured to take into account unexpected variations or conditions in the environment or unexpected changes in the operating characteristics of the CCD. Existing CCD camera systems have included reprogrammable software that can be varied by signals from a ground station. This has involved uploading software algorithms to the spacecraft and sometimes involves further processing of the CCD data on the ground. In some applications, for example, telescope guidance systems, post processing on the ground is not practical. Further, existing CCD camera systems cannot be reconfigured to meet new scientific objectives after the system has completed its intended use. Further, if scientific advances are made in the state-of-the-art, these changes cannot be implemented unless the changes relate solely to software.

SUMMARY OF THE INVENTION

It is an object of the present invention to provide a CCD camera system and method of operation thereof where the hardware and the software of the system is reprogrammable.

It is a further object of the present invention to provide a CCD camera system for use in space where the system uses programmable memory to configure the logic and field programmable gate arrays (FPGA) based on the programmable memory, the programmable memory also being used to generate the clocking patterns for the CCD camera systems, clocking patterns for the analog processing electronics, providing programmable voltage levels for the CCD camera system and the support software to configure the system.

A CCD camera system for use in space is in communication with a ground station. The system comprises a CCD having an input and an output, said input of said CCD being connected to reconfigurable hardware. The camera system is controlled by a computer, said computer controlling said CCD input and said CCD output. The computer has means to receive and transmit signals to said ground station.

A method of reconfiguring a CCD camera system in space using signals from a ground station, said system having a CCD with an input and output, said input being connected to reconfigurable hardware, said camera system being controlled by a computer, said computer having means to receive and transmit signals between said system and said ground station, said method comprising sending a signal from said ground station to said computer to reconfigure said hardware.

DESCRIPTION OF A PREFERRED EMBODIMENT

Figure 1:
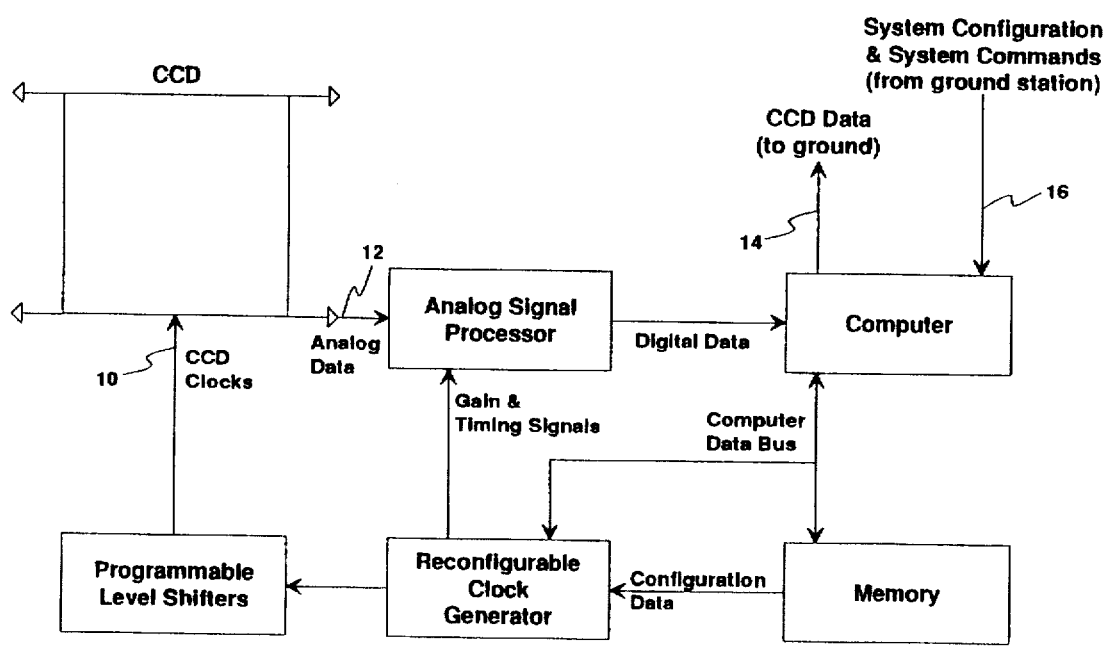
FIG. 1 is a block diagram showing a CCD camera system in accordance with the present invention.

In FIG. 1, a CCD camera system has a CCD, a reconfigurable clock generator, a programmable level shifter, an analog signal processor, a computer and reprogrammable memory. The CCD has an input 10 and an output 12.

The reprogrammable memory is connected to receive or transmit data to the computer and to transmit configuration data to the reconfigurable clock generator. A computer data bus connects the computer directly to the reconfigurable clock generator. The reconfigurable clock generator generates timing signals to the programmable level shifters. The programmable level shifters are in turn connected to the input 10 through CCD clocks. The reconfigurable clock generator transmits gain and timing signals to the analog signal processor. The analog signal processor is connected to the output 12 and receives analog data from the CCD which is converted to digital data and returned to the computer. The computer has means 14 for transmitting signals to a ground station and means 16 for receiving signals from a ground station. The reconfigurable clock generator is composed of one or more random access memory (RAM) based field programmable gate arrays (FPGA).

In operation, hardware and software configuration information is transmitted from the ground station to the means 16 for receiving signals of the computer. The information is used to program the reprogrammable memory. Hardware configuration data is then transferred from the memory to the RAM based FPGA clock generator. After the system has been reconfigured, the clock generator provides timing signals to the level shifters and to the analog signal processor. The CCD could have multiple outputs 12 connected to the analog signal processor in order to maximize the flexibility of the system. In addition to timing signals, the level shifters are also provided with data used to program the voltage levels used to drive the CCD.

Using flexible hardware, any type of CCD camera can be used by modifying the reconfigurable clock generator implemented in RAM based FPGA. Flexible hardware can be used to redefine the use of the CCD camera system. Flexible hardware can also be used to maintain the CCD camera system at an optimal performance level by reprogramming the system based on new knowledge discovered after the satellite has been launched into orbit. With the present invention, a camera system having a full frame CCD can be operated uniquely by controlling the full frame CCD as a frame transfer CCD.

The CCD camera system of the present invention has a high degree of flexibly accommodating the current and future demands for CCD satellite systems.

Flexibility of the system is achieved in four different ways:

software parameter;
software configuration;
hardware parameter; and
hardware configuration.

All parameters and configuration data are programmed via ground station commands or signals. In a typical operating mode, the software and hardware configuration will not change. Reconfigurable hardware is implemented in the above system by the inclusion of programmable memory, random access memory based FPGAs and software to support these functions. Hardware parameters are divided into two distinct groups: low level functions and high level functions. As a minimum, the high level functions define the required clocking sequence to read out the CCD and the low level functions define hardware parameters that in turn define clock voltage levels, the clock overlap time and the clock infrequency. These low level functions can be modified to optimize the CCD camera system performance after the device has degraded due to the space environment.

The electronic hardware used to generate the timing signals for the CCD camera system is implemented using RAM based FPGA. This approach allows the user to reconfigure the digital logic in the system. In a manner similar to redefining the system software, the computer can reconfigure the system logic used to generate the system timing. Thus, the high performance of a hardware based timing generator is combined with the adaptability of a software based reconfiguration method. The system of the present invention results in a high degree of flexibility.

Figure 2:
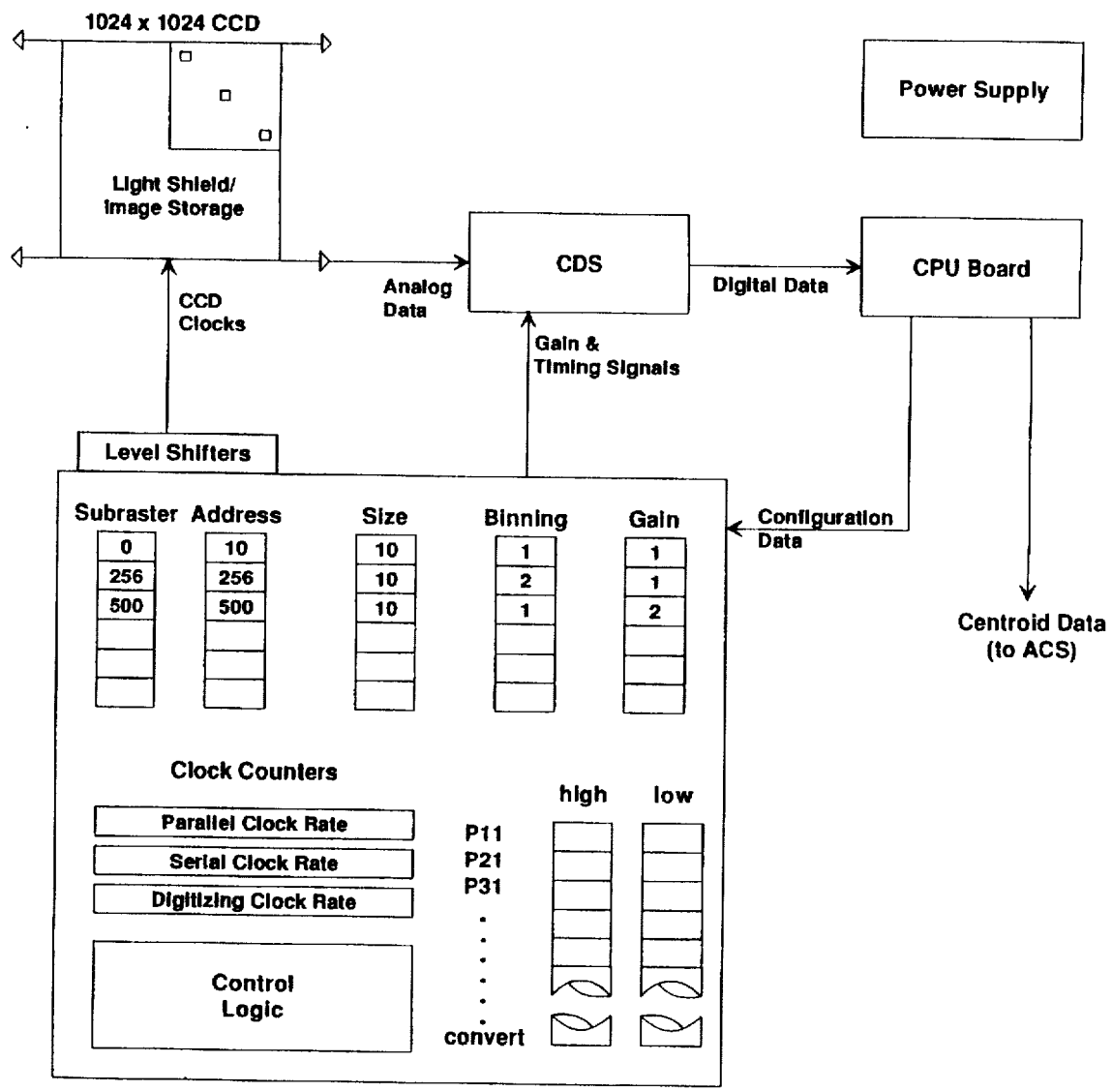
FIG. 2 is a block diagram of the present invention being used in a fine error sensor (FES).

As an example, a fine error sensor (FES) is used within the Lyman far ultraviolet spectroscopic explorer (FUSE) instrument. The FES is a star tracker-like device incorporating a CCD. The FES camera (which is a CCD camera system) housing the imaging optics, a three position filter wheel, a CCD and a preamplifier. The FES optical design uses two off-axis reflectors and two correction lenses near the CCD. The filter wheel is used to extend the dynamic range of the CCD to provide a colour filter for photometry. Exposure time for the CCD will be controlled using a frame transfer CCD. To minimize cost and procurement risk, a standard 1024×1024 back illuminated CCD will be used with a light shield covering three-quarters of the active area as shown in FIG. 2. The FES preamplifier utilizes the discreet field effect transistor (FET) pair and a low noise operational amplifier. This preamplifier configuration maintains the noise floor of the electronics lower than the reed-noise from the CCD.

The FES electronics box provides the interface between the FES camera and the FUSE instrument computer. The unit generates the CCD clocking signals, samples and converts the CCD output, regulates the input power and provides data processing.

Several parameters in the FES system are programmable via ground commands. Software parameters will control the image mode and the post-processing of the CCD data. To initiate an imaging mode, the software must first extract the software and hardware parameters from the ground command string and program the required registers. Software registers consist of a timer, a number of one bit flags, a filter wheel control register and a CCD temperature control register. The eight bit timer is used to control the frequency of consecutive images. One bit flags are used to enable or disable post-processing functions. These functions include mask cosmic rays, gain correction, dark current correction, threshold control and centroiding.

Software configuration refers to the FES system's ability to accept commands that will modify the system's firmware. This feature provides the ability to implement new functions after the instrument has been launched. If a coating area has propagated through the design cycle, the ability to correct the error exists. However this feature, given its ability to modify the system's firmware, can also present risks to the mission. To minimize these risks, core software functions will be protected via hardware design.

Hardware parameters are divided into two distinct groups: low level functions and high level functions. The high level functions define the required clocking sequence to read out up to six subrasters, sets of raster gain and define hardware binning. Low level hardware parameters define the clock voltage levels, the clock overlap time and the clocking frequency. The block diagram in FIG. 2 identifies the hardware registers that must be configured by the software.

The FES hardware used to generate the timing signals to the FES system are implemented using RAM based FPGA. This technology allows the user to reconfigure the digital logic in the system. In a manner similar to redefining the system software, the CPU can reconfigure the system's logic used to generate the system timing. Hence, the high performance of a hardware based timing generator is combined with the adaptability of a software based method. Table 1 relates to the manner in which the four layers of configuration are used to address general problems associated with the function of the FES camera.

The low level hardware parameters that provide adjustable timing and voltage are itemized in Table 2. The following paragraphs explain each of the items in Table 1 and provide a discussion of the causes, effects, solutions and the implementation of the adaptable features. Many of the parameters listed in Table 2 address several of the problems listed in Table 1.

Dark Current

Dark current is related to the operating temperature of the CCD. Since several other parameters listed in Table 1 are also related to the temperature, this section starts with a brief discussion on the CCD cooling system.

The FES cooling system includes a passive radiator, a cold strap and a heater. Heat is conducted

TABLE 1

Operational Problems and System Adaptability

| PROBLEM | CAUSE | EFFECT | ADAPTABLE FEATURE |
|---|---|---|---|
| increse CCD dark current. | temperature drift, radiation damage | increase NEA | programmable temperature |
| increase in CCD read-noise. | radiation damage | increase NEA | programmable VDD voltage, programmable timing |
| Loss of charge transfer efficiency in | radiation damage | increase NEA, reduction in | programmable temperature, programmable clocking speeds, |

TABLE 1-continued

Operational Problems and System Adaptability

| PROBLEM | CAUSE | EFFECT | ADAPTABLE FEATURE |
|---------|-------|--------|-------------------|
| the CCD. | | dynamic range | programmable clock voltages, re-configure software |
| Offset drift. | component aging, radiation damage | reduction in dynamic range | programmable offset |
| Flat-band shifts in CCD operating voltage. | radiation damage | reduction in dynamic range, increase NEA | programmable voltages |
| Parameter drift in analog components. | component aging, radiation damage | reduction in dynamic range, increase NEA | programmable timing |
| Maintaining optimization | limited access to the camera | reduction in dynamic range, increase NEA | programmable parameters and a methid to measure optimization |
| New requirements | length of design cycle, and maturing technology | non-optimized design | re-proframmable hardware |

TABLE 2

Hardware Programmable Parameters

| SIGNAL NAME | FUNCTION | PROGRAMMABLE PARAMETERS |
|-------------|----------|-------------------------|
| $P1_{image}$, $P1_{storage}$ | CCD parallel clocks | timing, clock high voltage, clock low voltage |
| $P2_{image}$, $P2_{storage}$, $P3_{image}$, $P3_{storage}$ | CCD parallel clocks | timing, clock high voltage, clock low voltage |
| S1, S2, S3, SW | CCD serial clocks | timing, clock high voltage, clock low voltage |
| TG | CCD transfer gate clock | timing, clock high voltage, clock low voltage |
| RG | CCD reset gate clck | timing |
| VDD | CCD output FET bias voltage | voltage level |
| RD | CCD reset FET bias voltage | voltage level | away from the CCD via the cold strap to the radiator. The temperature of the CCD is maintained by passive cooling and active heating. Based on a heat radiator area of one square foot, the temperature of the CCD will vary sinusoidally, on an orbital basis, between −67° C. and −77° C. A heater is used to remove the sinusoidal temperature swing and maintain the CCD at a constant temperature of −60° C. The required stability of the CCD's temperature is determined by the allowable variation in the dark current. Dark current can be calculated using equation (1).

$$D = 2.5 \times 10^{15} P_s N_{dc} T^{1.5} e^{-E/2kT} \quad (1)$$

where D is the dark current (e-/pixel/second), $P_s$ is the pixel area (cm$^2$), $N_{dc}$ is the dark current at room temperature (nA/cm$^2$), T is the temperature (k), E is the silicon band-gap energy (eV) and k is Boltzmann's constant. A two degree variation in the CCD temperature yields a dark current variation of less than one electron, at beginning of life. Radiation damage over the life of the mission will increase the mean dark current and the dark current variation due to temperature. Increased dark current due to radiation can be predicted by adding a radiation factor to equation (1), derived by experimentation. A two degree temperature increase at the end of life increases the dark current by three electrons.

The above discussion only refers to the increased noise floor due to the thermal shot noise of the mean dark current level. The mean dark current will be subtracted out by the software.

CCD Read-Noise

It has been shown that increased read-noise due to radiation damage can be compensated for by optimizing the drain voltage (VDD) on the CCD's output FET, maintaining the CCD at lower temperatures, and optimizing the sampling time of the correlated double sampler (CDS). The linear operating range of the FET will decrease as radiation damage accumulates. The FES design incorporates an eight bit DAC to ensure the FET is operating in the linear region. Lab results also show that a lower operating temperature will reduce the radiation induced read-noise.

The CDS is used to eliminate the equipartition noise of the CCD's reset FET. The noise is eliminated by sampling the CCD's output signal twice, once during the reset level (black video level) and once during the video level. The output signal from the CDS is the difference between the two signals. The equipartition noise within each of the two signals is unchanged or correlated in time. Thus, the equipartition noise is eliminated by the subtraction of the two input samples. To optimize the system performance, the time between the sampling of the two signals should be twice the time constant of the CDS at the beginning of life. In the FES design, the time between samples is programmable to compensate for radiation damage in the CCD's output FET.

Charge Transfer Efficiency

Degradation in the CCD's charge transfer efficiency (CTE) affects the low level signal response and the accuracy of the centroiding program.

Degradation in the CTE is caused by radiation induced traps. Charges collected in these traps are released at a rate defined by the traps' time constant. An adjustable temperature allows the time constant of the traps to be changed. The parallel clock rates are also programmable, as shown in FIG. 2. The temperature of the CCD and the parallel clock rate are optimized so the CCD transfer rate is much greater than the time constant of the traps, thereby reducing the traps' effect on the CCD CTE.

The firmware in the FES system can also accommodate advancements in centroiding programs which are suited for smeared images, caused by poor CTE. New programs can be uploaded to the FUSE instrument after launch using the modify-firmware command.

CTE can also be optimized by adjusting the CCD clock voltages and the timing relationship between the clock phases. These are two additional parameters which are programmable in the FES design.

Offset Drift

The dc output of the CDS drifts are due to component aging and radiation damage. When this dc level increases, the dynamic range of the system is reduced. An eight bit DAC is used to maintain this dc level at approximately ten analog to digital units.

Flat-Band Shifts

It has been demonstrated that the operating voltage of MOS devices change when exposed to a radiation environment. The voltage levels which are programmable are listed in Table 2. Some of these voltages are programmable for multiple reasons. For example, P3 is programmable to maintain optimal CTE, optimal multi-pinned phase (MPP) and to compensate for flat-band shifts.

Parameter Drift

Similar to offset drift and flat-band shifts, the electronics in the CDS circuit will drift due to component aging and radiation damage. The operational amplifiers are considered radiation hardened. The two parameters that can be used to compensate for parameter drift are the CDS timing signals and the programmable gain stage. The advantages of programmable CDS timing were previously discussed. The primary function of the programmable gain stage is to extend the dynamic range of the individual subrasters. A second function of the programmable gain stage is to compensate for drift in the gain of the system.

Maintaining Optimization

Several of the above paragraphs refer to optimized performance. The performance of the CCD will be characterized by measuring the read-noise, CTE and analyzing the raw data. Read-noise of the CCD will be measured using two methods, by sampling the signal in the non-active area of the CCD and by clocking all the collected charge away from the output amplifier. In both cases the output signal will represent the noise floor of the system. CTE will be measured using the extended pixel edge response (EPER) technique.

Changing Requirements

As mentioned in the introduction, changes in system requirements are common. The FES system used RAM based FPGA technology which allows the system user to redefine the closing concept. Combinatorial logic in RAM based FPGA is implemented using look-up tables. The elements of the look-up table are uploaded to the device after power is applied. In the FES system, four FPGAs are used to implement to required clocking logic. The four FPGAs require 256 kbytes of memory to store the configuration information. In a typical application, this memory is a serial PROM which is connected to the FPGA. In the FES system, the FPGA configuration memory interfaces with the CPU and the CPU interfaces with the FPGA. This configuration allows the CPU to modify the clocking logic via ground commands. The FES system design uses electrically erasable programmable read only memory (EEPROM) devices for the FPGA configuration data.

To confirm a new hardware configuration, the engineering model will be used for functional testing. After the new hardware configuration has been fully verified, the data shall be placed under configuration control. The final step, prior to uploading the new configuration, is the approval from the science operation centre. The upload process will be confirmed using a CRC and reading back the data. The hardware driven by the programmable logic cannot be damaged by an incorrect configuration. Several work-arounds exist if a failure occurred during the programming process. Work-arounds include rewriting the EEPOM, loading the FPGA directly from the ground command data or using the second FES system. For additional safety, the second FES system may have its ability to reconfigure itself disabled.

Additional Features

The use of FPGA in the FES design provides additional system advantages. The logic required to implement additional features is relieved by the use of high density FPGA. Two advantages of this are reduced CCD readout time and reduced clock noise.

To reduce CCD readout time, two provisions are incorporated in the logic used to generate the CCD clocks. First, there are two clocking frequencies for the CCD serial register, one for readout and one for flushing the unutilized CCD imaging area. A slow serial clock frequency is used to minimize the read-noise. A faster clock frequency is used to minimize the time required to flush the CCD serial register. The second method used to minimize the readout time is parallel binning between subrasters.

To reduce noise and CPU processing power requirements, the timing for the CCD clock signals are generated by dedicated logic. To maintain flexibility, the alternative would be to generate the CCD clock signals using software. Software timing would have minor variations in the timing loops causing an increase in the noise floor. The increased noise floor due to clock variation is characterized by equation (2).

$$N_{cj} = 2S_{off}(e^{-[(Ts-Ta/y)/Td]} - e^{-[(Ts+Ta/y)/Td]}) \quad (2)$$

where $N_{cj}$ is the noise generated by clock jitter (rms e−), $S_{off}$ is the signal level (e−), Ts is the sample to sample time (s), T is the period of the master clock, t is the master clock jitter (%) and Td is the dominant time constant of the analog signal chain. When using a CPU to generate the timing, the clock jitter would be related to the frequency and duration of the interrupt routines. The clock noise generated by the interrupt routine executing one CPU clock cycle later would be approximately 54 e–.

What we claim as our invention is:

1. A CCD camera system for use in space, said system being in signal communication with a ground station, said system comprising a CCD having an input and output, said input of said CCD being connected to at least one of reconfigurable hardware, reconfigurable software and field programmable gate arrays, said camera system being controlled by a computer, said computer controlling said CCD input and said CCD output, said computer having means to receive and transmit signals between said system and said ground station, said system being reconfigurable based on signals from said ground station.

2. A camera system as claimed in claim 1 wherein the computer has reconfigurable memory and reconfigurable software for operation thereof, said software being reconfigurable based on signals from said ground station.

3. A camera system as claimed in claim 1 wherein the system has reconfigurable hardware, the reconfigurable hardware comprising a reconfigurable clock generator.

4. A camera system as claimed in any one of claims 1, 2 or 3 wherein the system has reconfigurable hardware comprising programmable level shifters.

5. A camera system as claimed in any one of claims 1, 2 or 3 wherein an analog signal processor is connected between said CCD output and said computer to convert analog data from said output to digital data.

6. A camera system as claimed in any one of claims 1, 2 or 3 wherein the computer has a computer data bus connected to said reconfigurable clock generator, said reconfigurable clock generator being connected between said memory and said programmable level shifters, said clock generator also being connected to said analog signal processor, said programmable level shifters being connected to said camera input.

7. A camera system as claimed in any one of claims 1, 2 or 3 wherein the system has any two of reconfigurable hardware, reconfigurable software and field programmable gate arrays.

8. A camera system as claimed in any one of claims 1, 2 or 3 wherein the reconfigurable hardware has reconfigurable memory.

9. A camera system as claimed in any one of claims 1, 2 or 3 wherein the system has all three of reconfigurable hardware, reconfigurable software and field programmable gate arrays.

10. A method of reconfiguring a CCD camera system in space using signals from a ground station, said system having a CCD with an input and an output, said input being connected to at least one of reconfigurable hardware, reconfigurable software and field programmable gate arrays, said camera system being controlled by a computer, said computer having means to receive and transmit signals between said system and said ground station, said method comprising sending a signal from said ground station to said computer to reconfigure said system.

11. A method as claimed in claim 10 wherein said computer has reconfigurable memory and reconfigurable software, said method including the step of operating said computer using said reconfigurable software.

12. A method of operating a camera system as claimed in claim 10 wherein said system has a full frame CCD, said method including the step of controlling said full frame CCD as a frame transfer CCD.

\* \* \* \* \*